Figure 3:
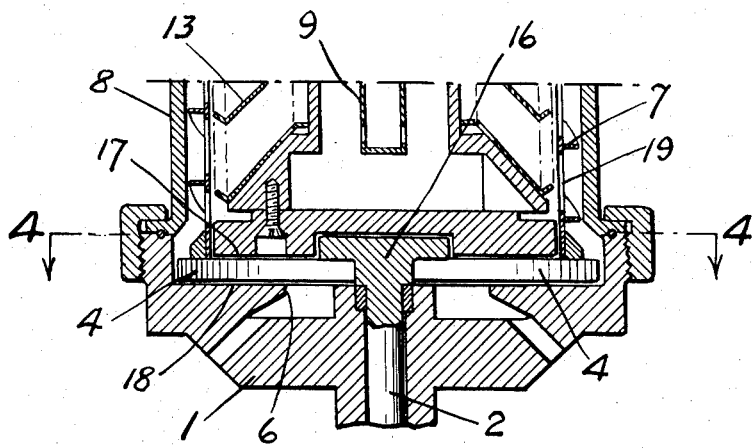

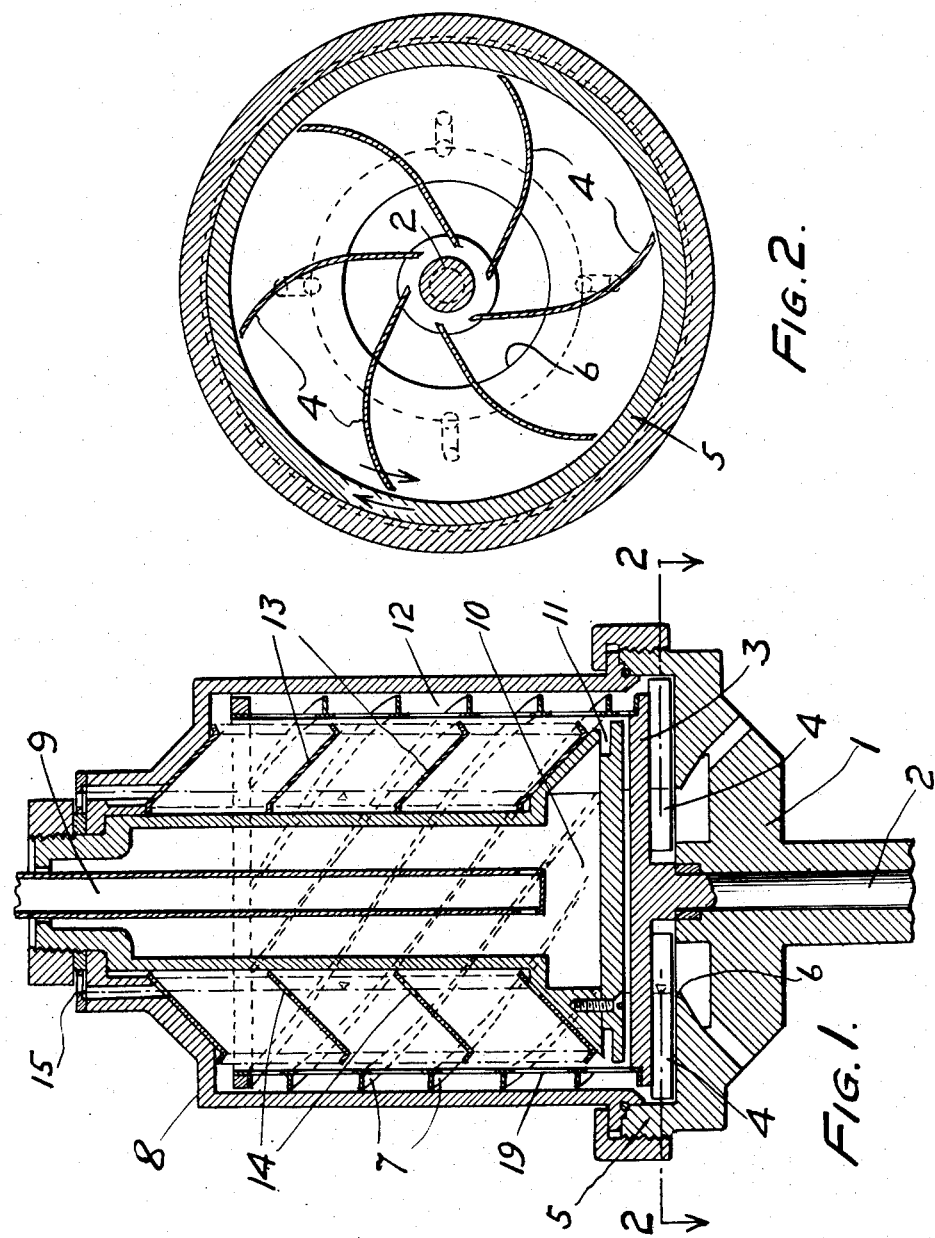

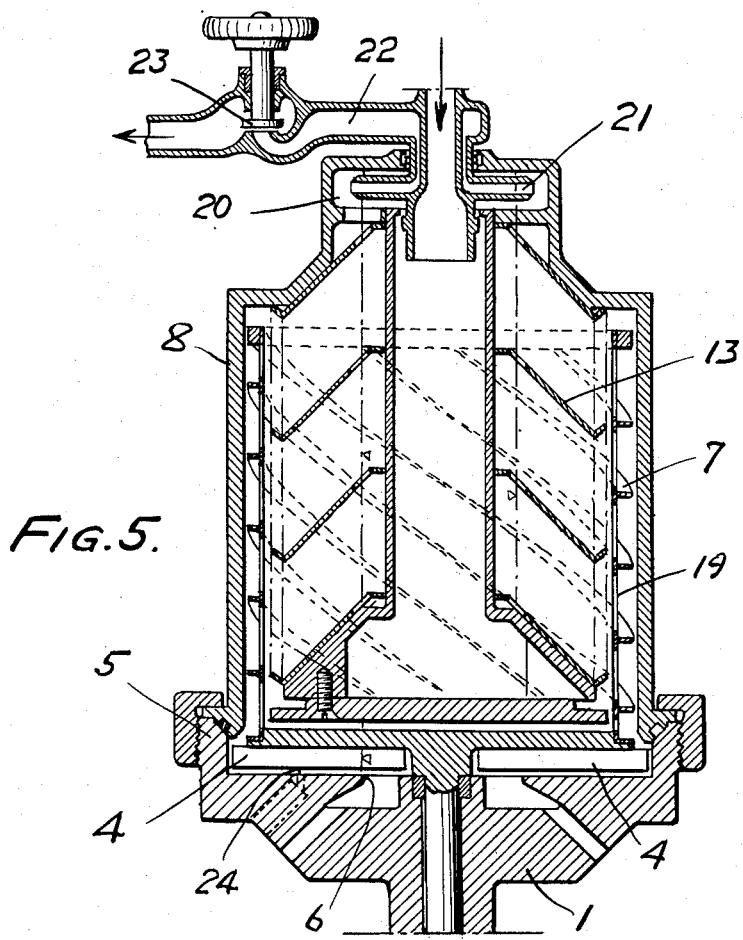

Patented Feb. 10, 1948

2,435,623

UNITED STATES PATENT OFFICE 2,435,623

CENTRIFUGES FOR SEPARATING FROM A LIQUID MATTERS SUSPENDED OR EMULGATED THEREIN

Erik August Forsberg, Nockeby, Sweden, assignor to Aktiebolaget Separator-Nobel, Stockholm, Sweden, a corporation of Sweden Application March 3, 1943, Serial No. 477,824
In Sweden March 11, 1942

4 Claims. (Cl. 233—29)

The removal of suspended or emulsified particles from liquids, for instance wax from fluid hydrocarbons, has heretofore been effected by means of centrifugal bowls provided with conveying members in the form of shovel wheels, by which the separated particles are conveyed from the radially outer part of the bowl to its outlet, which is located closer to the rotation axis. Bowls provided with a conveying worm have also been used for the same purpose, that is, to force the solid matters inwards. In all such cases the effect of the conveying member was to convey the particles to a level located nearer the center than the inner surface of the liquid in which they were contained. The particles were, so to speak, dredged from the outer part of the bowl to its outlet, which has always been located radially inside the said liquid level. The particles were thus separated from the liquid and were discharged from the centrifugal bowl together with as small a portion of the liquid as possible.

Devices of this type have operated satisfactorily in the treatment of some materials, but in other cases I have found that such conveying members cannot be used for removing the particles from the liquid. The passages for movement of these particles became clogged and all the material fed to the machine was discharged, in an unseparated condition, through the outlet for purified liquid. For instance, in the treatment of waxy oil the crystals agglomerated into a solid system in the shovel wheels, so that these were shut off from further supply of wax crystals. Consequently, the shovel wheels could not fulfill their purpose to convey wax from the outer part of the bowl to the outlet. The conditions may be similar in the case of centrifugal bowls provided with a conveying worm, leading to an outlet for the particles located inside the free level of the liquid.

According to this invention the particles are kept suspended in the liquid by a stirrer, while the liquid is passing to the outlet. The stirrer may advantageously be in the form of a system of vanes, extending from the outer part of the bowl inwards past the liquid outlet. The vanes should move relative to, and adjacent to, a fixed wall so that the particles are kept suspended in the liquid by the turbulence caused by the vanes and the fixed wall, and do not deposit on the wall or the vanes. In some cases of centrifugal treatment it may be sufficient that the system of vanes is open only towards one side, whereas on the opposite side the vanes are covered by a disc, to which they are fixed. In some other cases of centrifugal treatment it appears, however, to be desirable that the vane system shall be open to both sides, so that the vanes move between two fixed walls. Instead of a vane system a helically shaped member may in some cases probably be used, which advantageously may be a continuation of a movable transporting worm arranged outside the conical separating discs in the bowl. The object of the stirrer is to prevent an agglomeration of the particles which would render the flowing of the liquid towards and out thru the outlet difficult or impossible.

When a stirrer is used, the bowl may to advantage be arranged so that the two separated liquid components are more or less statically balanced against each other. It is, however, desirable to be able to regulate the proportion between the discharging liquids during operation. In the de-waxing of oils, for instance, the properties of the liquid fed into the bowl often change during operation. Such changes entail an increased tendency to clogging of the outlet for the wax-concentrate. As the latter should, of course, be as little diluted with oil as possible, it is desirable to be able to change the amount of discharging oil according to the varying conditions of operation, so that the wax concentrate is kept just fluid. Or in other words, it is desirable both to avoid clogging of the wax outlet and to keep the oil content as low as possible. This may be attained by adjusting, during operation, the proportion of wax concentrate relatively to the thruput according to the variations in the properties of the oil under treatment.

In order to obtain this possibility of regulation, the de-waxed oil may advantageously be discharged thru an outlet tightly connected to the bowl and provided with a throttle valve, or by means of a paring disc which may also be provided with a throttling device or may be arranged so as to be adjustable for discharging a larger or smaller amount of oil per unit of time. Alternatively, a "radially" movable paring tube may be used. The more the tube is pushed out from the axis of rotation, the more oil discharges thru it, and the less oil discharges together with the wax thru the wax outlet. Such radially movable tubes are well known in the art, as disclosed, for example, in the Petersen Patent No. 256,365, issued April 11, 1882.

It will be understood that the discharge devices above referred to may also be connected to the outlet for the liquid component containing the particles, although this is sometimes less advantageous owing to the greater risk of this outlet being clogged by deposits.

Figure 4:
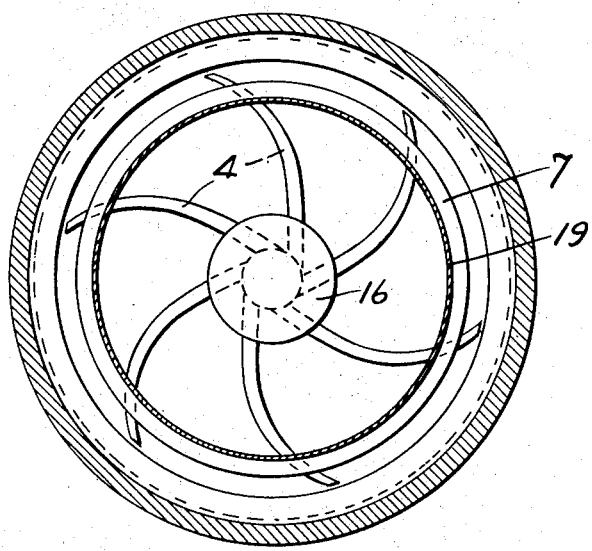

The accompanying drawing shows by way of example some embodiments of the arrangement according to the invention. Fig. 1 is a vertical sectional view of a centrifugal bowl, the discharge passage of which is provided with a stirrer built together with a transporting worm outside the set of discs. Fig. 2 shows a cross section of the bowl thru the stirrer on the line 2—2 of Fig. 1. Figs. 3 and 4 show a modified design of stirrer, Fig. 3 being a vertical sectional view and Fig. 4 a section on the line 4—4 of Fig. 3. Fig. 5 is a vertical sectional view of a centrifugal bowl embodying my invention and provided with a paring disc.

Extending through the centre of the centrifugal bowl bottom 1 is a shaft 2 which rotates relatively to the bowl and carries a disc 3, provided with a number of vanes 4, which extend from the outer wall 5 of the bowl to and past an outlet 6. To the disc 3 is secured a perforated cylinder 19, to which is secured a transporting worm 7 which, by rotating relatively to the bowl shell 8, forces the separated particles downwards to the vanes 4, the said separated particles being suspended in the liquid. The unit formed by the transport worm 7 and the cylinder 19 forms a system, between the bowl wall 8 and the set of discs 13, that is rotatable relative to the bowl, which system, together with the vanes 4, is driven by the shaft 2. When the liquid containing the particles has entered the system of vanes 4, the particles are kept suspended in the liquid by the stirring action of the vanes, until the liquid reaches the discharge edge 6. If there were no vanes, the particles would agglomerate to a non-fluid mass which would deposit on the walls of the liquid-chamber and finally block the outlet.

The bowl according to Fig. 1 is otherwise similar to known bowls of this type. The liquid to be treated is fed thru the central tube 9 into the distributor 10 and thence passes thru a plurality of openings 11 into the so-called sludge chamber 12 between the discs 13 and the bowl shell 8. From the chamber 12 the liquid flows inwards thru the interspaces between the discs, whilst heavier particles are separated by the centrifugal force and thrown back into the sludge chamber 12 and are thence conveyed to the vanes 4 by the worm 7. The liquid liberated from particles flows upwards thru the openings 14 in the discs 13 to the level outlet 15. The outlets 6 and 15 are located at approximately the same radial distance from the rotation axis of the bowl, so that at least an approximate statical equilibrium prevails.

As will be seen from Fig. 2, the outer ends of the vanes 4 are bent forward in the direction of rotation of the vanes relative to the bowl wall. They will therefore scrape off and remove such particles which have a tendency to stick to the bowl wall. The particles are thereby kept suspended in the liquid by the vanes 4 and are thus prevented from depositing on the walls of the bowl.

According to Figs. 3 and 4 the vanes 4 are fixed to a nave 16 on the shaft 2. The vanes rotate between walls 17 and 18, both of which are stationary relative to the bowl and therefore have a more powerful stirring action than the vanes shown in Fig. 1. The outer ends of the vanes are fixed to the cylinder 19.

Fig. 5 shows how a bowl embodying the invention may be provided with means to regulate the concentration of the particles during operation. The upper part of the bowl shell 8 is provided with a paring chamber 20, enclosing a paring disc 21. In the discharge channel 22 communicating with the paring disc is a valve 23, by means of which the free level of the liquid contained in the chamber 20 may be so regulated, during operation, that the component discharging thru the outlet 6 will be kept fluid without any risk of clogging. The paring disc may alternatively be provided with guide blades, adjustable during operation, for instance movable in radial direction or individually tiltable, thru the adjustment of which the level is displaced.

In the bottom part 1 of the bowl shown in Fig. 5 is an outlet channel 24 (which may be advantageously provided with a nozzle, not shown) having a restricted inlet opening through which the liquid is pressed. This restricted opening acts as a throttle and thus restricts the amount of liquid discharging per time unit. It will be understood that it is within the scope of the invention to discharge a greater or lesser portion, possibly the whole amount, of the liquid containing particles thru such outlet or possibly several such outlets. Also, in case an outlet of this type is used, it is necessary to keep the particles suspended in the liquid by means of a stirrer, when it is passing from the bowl wall 5 to the outlet 24.

What I claim and desire to protect by Letters Patent is:

1. In a centrifuge for separating, from a mixture of solids and liquids, a heavier constituent comprising a liquid rich in solid particles and a lighter constituent comprising a liquid poor in solid particles, the same comprising a centrifugal bowl having discharge outlets for the light and heavy constituents, both outlets being located a substantial distance from the peripheral wall of the bowl and at such radial distance from the axis of rotation as to effect simultaneous discharge of both liquids, a shaft driving the bowl, a disc rotatable with the bowl shaft and spaced from the bowl bottom and providing a space to which the heavier constituent is conveyed and which communicates with the discharge outlet for the heavier constituent, a cylinder spaced from the bowl wall providing an annular chamber within which the separated heavier constituent is conveyed to the peripheral part of said space; vanes of a width approximating the width of said space extending within said space from the peripheral part of the bowl to and beyond the outlet for liquid rich in solid particles, and means, including a driving shaft, carrying said cylinder and vanes and rotatable in unison around and approximately concentric with the axis of and at a different speed from that of the bowl, said vanes effecting a stirring of the material conveyed to said space to thereby keep the solid particles suspended in the carrying liquid, thus preventing agglomerating of the solid particles and insuring continuous flow and discharge thereof with the carrying liquid through the last named outlet.

2. In a centrifuge for separating, from a mixture of solids and liquids, a heavier constituent comprising a liquid rich in solid particles and a lighter constituent comprising a liquid poor in solid particles; the same comprising a centrifugal bowl having discharge outlets for the light and heavy constituents, both outlets being located a substantial distance from the peripheral wall of the bowl, a shaft driving the bowl, a disc rotatable with the bowl shaft and spaced from the bowl bottom and providing inside the bowl and adjacent the end thereof at which the outlet for the heavier constituent is located a space communicating with said outlet and with the periphery of the bowl and into which the separated heavier constituent from the peripheral part of the bowl flows, the two outlets being located at such relative radial distances from the axis of rotation as to effect simultaneous discharge of both liquids; stirring devices of a width approximating the width of said space extending within said space from the peripheral part of the bowl to said outlet for liquid rich in solid particles and adapted to keep the solid particles suspended in the carrying liquid flowing through said space and out of the last named outlet, and means, including a shaft, driven at a speed different from that of the bowl, connected with and adapted to actuate said stirring devices, thereby preventing agglomeration of the solid particles and insuring continuous outflow and discharge thereof with the carrying liquid through the last named outlet.

3. In a centrifuge for separating, from a mixture of solids and liquids, a heavier constituent comprising a liquid rich in solid particles and a lighter constituent comprising a liquid poor in solid particles, the same comprising a centrifugal bowl having discharge outlets for the light and heavy constituents, both outlets being located a substantial distance from the peripheral wall of the bowl, a shaft driving the bowl, a disc rotatable with the bowl shaft and spaced from the bowl bottom and providing inside the bowl and adjacent the end thereof at which the outlet for the heavier constituent is located a space communicating with said outlet and with the periphery of the bowl and into which the separated heavier constituent from the peripheral part of the bowl flows, the two outlets being located at such relative radial distances from the axis of rotation as to effect simultaneous discharge of both liquids; vanes of a width approximating the width of said space extending within said space from the peripheral part of the bowl to and beyond the outlet for liquid rich in solid particles, and means, including a driving shaft, carrying said vanes and rotatable in unison around and approximately concentric with the axis of the bowl independently of and at a different speed from that of the bowl, said vanes effecting a stirring of the material in said space to thereby keep the solid particles suspended in the carrying liquid moving toward the outlet therefor, thus preventing agglomerating of the solid particles and insuring continuous flow and discharge thereof with the carrying liquid through the last named outlet.

4. In a centrifuge for separating, from a mixture of solids and liquids, a heavier constituent comprising a liquid rich in solid particles and a lighter constituent comprising a liquid poor in solid particles: the same comprising a centrifugal bowl having discharge outlets for the light and heavy constituents, both outlets being located a substantial distance from the peripheral wall of the bowl, a shaft driving the bowl, means providing inside the bowl and adjacent the end thereof at which the outlet for the heavier constituent is located a space communicating with said outlet and with the periphery of the bowl and into which the separated heavier constituent from the peripheral part of the bowl flows, the two outlets being located at such relative radial distances from the axis of rotation as to effect simultaneous discharge of both liquids; stirring devices extending within said space from the peripheral part of the bowl to said outlet for liquid rich in solid particles and adapted to keep the solid particles suspended in the carrying liquid flowing through said space and out of the last named outlet, means, including a shaft, driven at a speed different from that of the bowl, connected with and adapted to actuate said stirring devices, thereby preventing agglomeration of the solid particles and insuring continuous outflow and discharge thereof with the carrying liquid through the last named outlet; a paring chamber into which the lighter liquid poor in solid particles is discharged, a parer in the paring chamber, an outlet from the paring chamber and a valve in said outlet which is adjustable to regulate the free level of liquid in the paring chamber and thereby regulate the fluidity of the component discharging through the outlet for the heavier constituent.

ERIK AUGUST FORSBERG.

REFERENCES CITED

The following references are of record in the file of this patent:

UNITED STATES PATENTS

| Number | Name | Date |
|---|---|---|
| 837,695 | Ljungstrom | Dec. 4, 1906 |
| 921,814 | Ericsson | May 18, 1909 |
| 1,572,299 | McEntire | Feb. 9, 1926 |
| 536,444 | Reid | Mar. 26, 1895 |